United States Patent
Foygel et al.

(10) Patent No.: US 11,257,159 B2
(45) Date of Patent: *Feb. 22, 2022

(54) SYSTEM AND METHOD FOR DYNAMICALLY MANAGING MESSAGE FLOW

(71) Applicant: TRADING TECHNOLOGIES INTERNATIONAL INC., Chicago, IL (US)

(72) Inventors: Alexander V. Foygel, Highland Park, IL (US); Bharat Mittal, Schaumburg, IL (US); Douglas R. Duquette, Gloucester, MA (US)

(73) Assignee: Trading Technologies International, Inc., Chicago, IL (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/909,399

(22) Filed: Jun. 23, 2020

(65) Prior Publication Data

US 2020/0320629 A1    Oct. 8, 2020

Related U.S. Application Data

(63) Continuation of application No. 16/448,897, filed on Jun. 21, 2019, now Pat. No. 10,733,670, which is a
(Continued)

(51) Int. Cl.
*G06Q 40/04* (2012.01)
*H04L 69/329* (2022.01)
(Continued)

(52) U.S. Cl.
CPC ............ *G06Q 40/04* (2013.01); *H04L 29/06* (2013.01); *H04L 29/08072* (2013.01);
(Continued)

(58) Field of Classification Search
CPC ... G06Q 40/04; H04L 29/06; H04L 29/08072; H04L 47/10; H04L 47/28; H04L 47/29;
(Continued)

(56) References Cited

U.S. PATENT DOCUMENTS 4,644,472 A    2/1987 Montgomery
5,937,388 A    8/1999 Davis et al.
(Continued)

OTHER PUBLICATIONS

Extended European Search Report in European Patent Application No. 09803429.1 dated Aug. 12, 2013, dated Aug. 26, 2013.
(Continued)

*Primary Examiner* — Khanh Q Dinh

(57) ABSTRACT

System and method for dynamically managing message flow. According to the example embodiments, an intermediary network device or a client device dynamically manages the flow of messages received from an electronic exchange by analyzing the client device's capabilities, such as CPU utilization. Based on a percentage of total CPU utilization, the level of throttling is dynamically adjusted, such that if the percentage of CPU utilization, or load, increases, then throttling is increased from a lower level to a higher level. Similarly, if the percentage of CPU utilization decreases significantly enough, then throttling is decreased to a lower level.

10 Claims, 3 Drawing Sheets

Related U.S. Application Data continuation of application No. 15/459,967, filed on Mar. 15, 2017, now Pat. No. 10,380,688, which is a continuation of application No. 14/488,974, filed on Sep. 17, 2014, now Pat. No. 9,639,896, which is a continuation of application No. 13/363,642, filed on Feb. 1, 2012, now Pat. No. 8,868,776, which is a continuation of application No. 12/910,027, filed on Oct. 22, 2010, now Pat. No. 8,131,868, which is a continuation of application No. 12/180,942, filed on Jul. 28, 2008, now Pat. No. 7,844,726.

(51) Int. Cl.
*H04L 9/40* (2022.01)
*H04L 47/10* (2022.01)
*H04L 47/28* (2022.01)
*H04L 67/62* (2022.01)
*H04L 67/303* (2022.01)
*H04L 67/568* (2022.01)

(52) U.S. Cl.
CPC .............. *H04L 47/10* (2013.01); *H04L 47/28* (2013.01); *H04L 47/29* (2013.01); *H04L 67/303* (2013.01); *H04L 67/325* (2013.01); *H04L 69/329* (2013.01); *H04L 67/2842* (2013.01)

(58) Field of Classification Search
CPC .. H04L 67/303; H04L 67/329; H04L 67/2842
USPC .......................... 709/220, 222, 223, 225, 228
See application file for complete search history.

(56) References Cited

U.S. PATENT DOCUMENTS

| | | | |
|---|---|---|---|
| 6,910,024 B2 | 6/2005 | Krishnamurthy et al. | |
| 6,934,735 B1 | 8/2005 | Emens et al. | |
| 6,981,052 B1 | 12/2005 | Cheriton | |
| 7,124,110 B1 | 10/2006 | Kemp, II et al. | |
| 7,143,186 B2 | 11/2006 | Stewart et al. | |
| 7,155,477 B2 | 12/2006 | Blair et al. | |
| 7,184,966 B1 | 2/2007 | Parsonnet et al. | |
| 7,239,612 B1 | 7/2007 | Cole et al. | |
| 7,260,543 B1 | 8/2007 | Saulpaugh et al. | |
| 7,401,334 B2 | 7/2008 | Fussell | |
| 7,434,225 B2 | 10/2008 | Groetzner et al. | |
| 7,447,645 B2 | 11/2008 | Spragle et al. | |
| 7,493,407 B2 | 2/2009 | Leedom et al. | |
| 7,562,041 B2 | 7/2009 | Chehade et al. | |
| 7,698,187 B2 | 4/2010 | Huizing et al. | |
| 7,702,806 B2 | 4/2010 | Gil et al. | |
| 7,747,513 B2 | 6/2010 | Duquette et al. | |
| 7,758,811 B2 | 7/2010 | Durack et al. | |
| 7,844,726 B2 | 11/2010 | Foygel et al. | |
| 7,844,776 B2 | 11/2010 | Chen | |
| 7,873,827 B2* | 1/2011 | Miyazawa | H04L 63/062 713/156 |
| 7,945,508 B2 | 5/2011 | Duquette et al. | |
| 8,131,868 B2 | 3/2012 | Foygel et al. | |
| 8,286,867 B1 | 10/2012 | Brown et al. | |
| 8,555,288 B2 | 10/2013 | Brown et al. | |
| 8,856,267 B2* | 10/2014 | Sullivan | H04L 29/12047 709/217 |
| 8,868,776 B2 | 10/2014 | Foygel et al. | |
| 9,137,268 B2* | 9/2015 | Yang | H04L 65/1066 |
| 9,351,133 B2 | 5/2016 | Offen et al. | |
| 9,450,404 B2 | 9/2016 | Chung | |
| 9,639,896 B2 | 5/2017 | Foygel et al. | |
| 10,380,688 B2 | 8/2019 | Foygel et al. | |
| 10,700,986 B2* | 6/2020 | Rahul | H04L 47/28 |
| 10,708,440 B1* | 7/2020 | Liu | H04N 21/00 |
| 2002/0188654 A1 | 12/2002 | Tedone et al. | |
| 2005/0122985 A1 | 6/2005 | Murphy | |
| 2006/0195508 A1 | 8/2006 | Bernardin et al. | |
| 2006/0294228 A1 | 12/2006 | Almstrom | |
| 2007/0100735 A1 | 5/2007 | Kemp, II et al. | |
| 2007/0168104 A1 | 7/2007 | Nelson et al. | |
| 2007/0198397 A1 | 8/2007 | McGinley et al. | |
| 2008/0049787 A1 | 2/2008 | McNaughton et al. | |
| 2008/0097887 A1 | 4/2008 | Duquette et al. | |
| 2008/0162324 A1 | 7/2008 | West et al. | |
| 2010/0023645 A1 | 1/2010 | Foygel et al. | |
| 2010/0228833 A1 | 9/2010 | Duquette et al. | |
| 2010/0318673 A1 | 12/2010 | Kemp, II et al. | |
| 2011/0040890 A1 | 2/2011 | Foygel et al. | |
| 2011/0184849 A1 | 7/2011 | Duquette et al. | |
| 2012/0131221 A1 | 5/2012 | Foygel et al. | |
| 2012/0271748 A1* | 10/2012 | DiSalvo | G06Q 40/04 705/37 |
| 2013/0160073 A1 | 6/2013 | You | |
| 2013/0185421 A1* | 7/2013 | Yang | H04L 65/1066 709/224 |
| 2013/0294336 A1 | 11/2013 | Morken et al. | |
| 2014/0280621 A1 | 9/2014 | Bourdaillet et al. | |
| 2015/0006356 A1 | 1/2015 | Foygel et al. | |
| 2015/0036569 A1 | 2/2015 | Vannithamby et al. | |
| 2015/0046514 A1 | 2/2015 | Madan et al. | |
| 2016/0105561 A1 | 4/2016 | Glagolev et al. | |
| 2017/0180336 A1 | 6/2017 | Josephson et al. | |
| 2017/0186088 A1 | 6/2017 | Foygel et al. | |
| 2018/0357573 A1 | 12/2018 | Scarborough et al. | |
| 2019/0311435 A1 | 10/2019 | Foygel et al. | |

OTHER PUBLICATIONS

International Search Report of International Application No. PCT/US2009/051820, dated Sep. 1, 2009 (dated Sep. 15, 2009).

* cited by examiner

SYSTEM AND METHOD FOR DYNAMICALLY MANAGING MESSAGE FLOW

CROSS REFERENCE TO RELATED APPLICATIONS

This application is a continuation of U.S. patent application Ser. No. 16/448,897 filed Jun. 21, 2019, now U.S. Pat. No. 10,733,670, which is a continuation of U.S. patent application Ser. No. 15/459,967 filed Mar. 15, 2017, now U.S. Pat. No. 10,380,688, which is a continuation of U.S. patent application Ser. No. 14/488,974 filed Sep. 17, 2014, now U.S. Pat. No. 9,639,896, which is a continuation of U.S. patent application Ser. No. 13/363,642 filed Feb. 1, 2012, now U.S. Pat. No. 8,868,776, which is a continuation of U.S. patent application Ser. No. 12/910,027 filed Oct. 22, 2010, now U.S. Pat. No. 8,131,868, which is a continuation of U.S. patent application Ser. No. 12/180,942 filed Jul. 28, 2008, now U.S. Pat. No. 7,844,726, the contents of each of which are fully incorporated herein by reference for all purposes.

FIELD OF INVENTION

The present invention is directed toward electronic trading. More specifically, the present invention is directed toward dynamically managing message flow.

BACKGROUND

At one time, there were only open-outcry exchanges where traders, specifically buyers and sellers, would come together to trade in person. With the advent of electronic trading, traders can participate at their client devices from remote distances by communicating over physical networks with electronic exchanges that automatically match bids and offers.

In particular, subscribing traders are connected to an exchange's electronic trading platform by way of a communication link and through an application program interface to facilitate real-time electronic messaging between themselves and the exchange. The electronic trading platform includes at least one electronic market, which is at the center of the trading system and handles the matching of bids and offers placed by the traders for that market. The electronic messaging includes market information that is distributed from the electronic market to the traders via an electronic data feed. Once the traders receive the market information, it may be displayed to them on their trading screens. Upon viewing the information, traders can take certain actions including the actions of sending buy or sell orders to the electronic market, adjusting existing orders, deleting orders, or otherwise managing orders. Traders may also use automated tools on their client devices to automate these and additional actions.

Although the amount or type of market information published by an electronic exchange often differs from exchange to exchange or from market to market, there are generally some standard pieces of information. Market information may include data that represents just the inside market. The inside market is the lowest available offer price (best ask) and the highest available bid price (best bid) in the market for a particular tradeable object at a particular point in time. Market information may also include market depth. Market depth refers to quantities available at the inside market as well as quantities that may be available at other prices away from the inside market. The quantity available at a given price level is usually provided by the exchange in aggregate sums. In other words, an exchange usually provides the total buy quantity and the total sell quantity available in the market at a particular price level in its data feed. In addition to providing order book information such as price and quantity information, electronic exchanges can offer other types of market information such as the open price, settlement price, net change, volume, last traded price, the last traded quantity, and order fill information.

Due to the massive amounts of market updates received from an electronic exchange, the central processing unit(s) (CPU) of client devices can be extremely overwhelmed. Client devices often struggle to balance the message processing load with other activities such as responding to user's actions, because most often traders want access to as much of this information as quickly and as accurately as possible so that they can make the most effective and efficient trades. For example, client devices may experience sluggish responsiveness to user actions, lost network messages or delayed market information updates, or when trading with automated tools the tools may have a slow response or base their decision on out-of-date information, which may all lead to lost opportunities for the trader.

In an attempt to limit the load on the network and client devices, electronic exchanges often limit the market depth offered as market information. For instance, an electronic market might offer only "5" levels of market depth, which includes the quantities available at the current top "5" buy prices and the quantities available at the current top "5" sell prices. Despite the attempts made by electronic exchanges and others to improve and control the distribution of market information, there are still many disadvantages to the current methods of distribution and processing and client systems continue to suffer from the amount of messages received from electronic exchanges.

As more traders begin trading in an electronic trading environment, the amount of message traffic and the load on the client devices' CPU's is likely to continue growing at an increased rate and, at least during those times, client devices will continue to have difficulty maintaining near real-time data processing. In an industry where speed and accuracy are of the utmost importance, receiving delayed or inaccurate market information can be extremely detrimental to a trader and can possibly cost the trader hundreds, thousands, or even millions of dollars.

SUMMARY

The embodiments described herein provide a system and method for dynamically managing message flow. To illustrate the present invention and aspects thereof, the following description, including the figures and detailed description, provides examples that can be used or readily modified by one of ordinary skill to generate a system or method that benefits from the teachings described and claimed herein.

Currently, electronic exchanges send a massive amount of messages containing market information to intermediary network and client devices. These devices can become extremely overwhelmed and overburdened, such that the client device may become unresponsive or delayed in updating market information on the graphical user interface. This can be detrimental for a trader who anticipates receiving the most up to date market information to make efficient and effective trades.

The system and method are based on dynamically throttling, or controlling the rate of message updates processed by a client device to balance CPU processing and system responsiveness. CPU utilization can be affected by, for example, market activity, system busyness, or trader actions on the client device such as opening applications or opening additional trading workspaces. Dynamically throttling and managing message flow based on the CPU utilization will allow the client device to stay responsive during a situation that might otherwise decrease real-time system responsiveness. It should be understood that dynamically throttling and managing message flow can be based on other resources for example, message rate, known as the rate that messages are received, or message latency, known as the time it takes for a given message to be processed. However, the following examples focus on CPU utilization to measure what level of throttling may be applied to incoming messages.

According to the example embodiments, the client device dynamically manages the flow of messages received from the electronic exchange or intermediary network device by monitoring the client device's capabilities, for example CPU utilization. CPU utilization may be defined as a range, such as "minimal", "low", "medium", "high", and "critical". Specifically, the "minimal" amount CPU utilization would be about below "30%"; a "low" amount of CPU utilization would be about between "31-50%"; a "medium" amount of CPU utilization would be about between "51-70%"; a "high" amount of CPU utilization would be about between "71-90%"; and a "critical" amount of CPU utilization would be about above "90%".

Based on a percentage of CPU utilization, a throttling component located within the client device dynamically adjusts the level of throttling to control the message flow to be processed by the processing component. For example, if the percentage of CPU utilization, also known as "load," increases, then throttling is increased from a lower level to a higher level. If at a later time the percentage of CPU utilization decreases enough, then throttling is decreased to a lower level. It should be understood that the effect of increased throttling is a slower rate of messages for the processing component located within the client device to process. Likewise, the effect of decreased throttling is a faster rate of messages for the client device to process. For example, processing may include updating market information displayed by the graphical user interface or processing market information to be used by other client device components. It should also be understood that dynamically throttling and managing message flow may take place at an intermediary device as well as a client device. The following embodiments are not limited to the location at which dynamic throttling occurs.

According to another example embodiment, multiple levels of throttling are defined to exercise different levels of control over the message rate. Each level of throttling is characterized by the amount of time messages are delayed by the throttling component before passing them to other client device's components, such as the processing component. For example, "minimal" may be the lowest and "critical" may be the highest level of throttling.

Each level of throttling has an associated hold (message delay) time. For example, if the hold time for level "low" is defined as 20 milliseconds, then the minimum interval between processing messages is 20 milliseconds. All messages related to the same tradeable object that were received during this period of time may be combined into a single message and then passed to the processing component when the hold time lapses. In some cases, this may be done by keeping just the latest message and ignoring all the previous messages for the same trading object. If a new market message is not received within the defined hold time of 20 milliseconds, then the next received message will immediately be passed from the throttling component to the processing component or other components running on the client device. Likewise, the hold time for level "medium" throttling may be defined as 30 milliseconds, such that the minimum interval between processing messages is 30 milliseconds. If the level of throttling increases before the hold time lapses, then the messages being held will be held for an increased amount of time. Likewise, if the level of throttling decreases before the hold time lapses, then the messages will be held for less time.

It should be understood that as the level of throttling increases, the defined hold time also increases and vice versa. Changing the level of throttling by the throttling component results in increasing or decreasing the rate of message updates passed to the processing component or other client device components.

According to yet another example embodiment, some levels of throttling may inspect the contents of the message to decide whether it can be delayed or should be immediately passed to the processing component within the client device. For example, some levels of throttling may consider messages containing inside market information or information to be used by automated tools as "high priority" messages to a trader. If the client device is within such a level of throttling, these messages may be passed to the processing component without being delayed.

According to the example embodiments, the percentage of CPU utilization is routinely monitored and based on the percentage, the level of throttling will either be increased or decreased one or more level at a time. Specifically, when the percentage of CPU utilization becomes "high," the throttling component will increase throttling by one or more level, for example, from "minimal" to "low." The effect of increasing throttling by one level is that the messages will be stored for a longer hold time before being sent to the processing component. Similarly, when the percentage of CPU utilization becomes "minimal," the throttling component will decrease throttling by one or more level. The effect of decreasing throttling by one or more levels is that the messages will be stored for a shorter hold time before being sent to the processing component. Additionally, if the percentage of CPU utilization stays in the "low" range for a configurable amount of time, the throttling component will decrease throttling by one or more level to throttle as little as possible while maintaining system responsiveness.

According to an additional embodiment, throttling may be increased to the highest, or near highest, level of throttling in one step, instead of modifying throttling one level at a time. This is extremely useful when the increase in CPU utilization is predictable and temporary. Specifically, the throttling component increases throttling to the highest level when a condition that may lead to the CPU overload is expected, and remains at that level of throttling until the condition has ceases to exist. For example, when a trader is opening a trading workspace, the client device may jump to the highest level of throttling in order to keep the system as responsive as possible. As soon as the trading workspace is open, the level of throttling will be reduced to the initial level instead of decreasing one level at a time.

According to an alternative embodiment, if the percentage of CPU utilization exceeds "critical," throttling is increased to the highest level and then decreased one level of throttling at a time after the CPU utilization has gone below a configurable level, for example, below the "medium" or "low" level. This is very useful when there is an unexpected increase in CPU utilization, for example, when an unemployment number is announced or the trader starts utilizing the computer to run other applications. In this instance, the client device may be completely overwhelmed with messages from the electronic exchange or intermediary network device and increasing throttling to the highest level will allow the system to maintain responsiveness.

According to the example embodiments, a client device may have more than one CPU, and one of the CPUs may be busier than other CPUs. Specifically, the load may not be evenly distributed across all CPUs on a client device. In this instance, the client device may determine the percentage of CPU utilization in multiple ways. For example, the client device may analyze the busiest CPU, where less busy CPUs are disregarded; calculate a total CPU utilization, where the total amount of CPU usage is calculated over all CPUs; or use a weighted average of the busiest and the total CPU utilization. These methods of determining the percentage of CPU utilization will be described further in detail in upcoming sections.

Other examples are provided herein. Modifications may also be made to the system and methods without departing from the spirit or scope of the invention. Additional features and advantages of the embodiments will be set forth in the description that follows. The features and advantages of the example embodiment may be realized and obtained through the embodiments particularly pointed out in the appended claims. These and other features will become more fully apparent from the following description, figures, and appended claims, or may be learned by the practice of the example embodiments as set forth hereinafter.

BRIEF DESCRIPTION OF THE DRAWINGS

Example embodiments are described herein with reference to the following drawings, in which.

DETAILED DESCRIPTION

The present invention is related to dynamically managing message flow. To illustrate aspects of the present invention, a system and method are illustrated in example form using the drawings referred to herein. One of ordinary skill in the art will recognize, however, that such examples may be quickly and readily adaptable using the teachings described herein. Aspects of the present invention are protected by the accompanying claims. Limitations from the patent specification should not be improperly incorporated into the claims unless explicitly stated or otherwise inherently known.

I. A First Example Trading System

Figure 1:
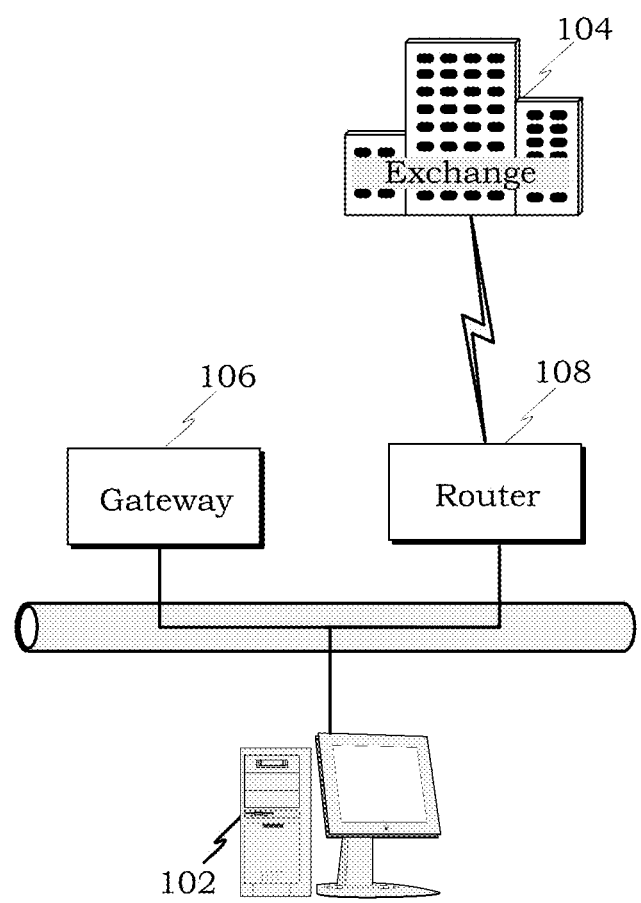
FIG. 1 is a block diagram illustrating a trading system for dynamically managing the flow of message in an electronic trading environment.

FIG. 1 illustrates an example electronic trading system in an electronic trading environment. In this example, the trading system comprises a client device 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the client device 102 with orders from other client devices (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the types of order execution algorithms used, the electronic exchange 104 provides market information to the subscribing client device 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually, although not necessarily, provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchange 104 can offer other types of market information such as the last traded price (LTP), the last traded quantity (LTQ), and order fill information.

The computer employed as the client device 102 generally can range from a handheld device, laptop, or personal computer to a larger computer such as a workstation with multiple multiprocessors. Generally, the client device 102 includes a monitor (or any other output device) and an input device, such as a keyboard, a trackball, and/or a two or three-button mouse to support click based trading, if so desired. One skilled in the art of computer systems will understand that the present example embodiments are not limited to any particular class or model of computer employed for the client device 102 and will be able to select an appropriate system.

The computer employed as the gateway 106 generally can range from a personal computer to a larger or faster computer. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a client device or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

In general, it should be understood that the devices described herein could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

It should also be noted that the client device 102 generally executes application programs resident at the client device 102 under the control of the operating system of the client device 102. Also, the gateway 106 executes application programs resident at the gateway 106 under the control of the operating system of the gateway 106. In other embodiments and as understood by a person skilled in the art, the function of the application programs at the client device 102 may be performed by the gateway 106, and likewise, the function of the application programs at the gateway 106 may be performed by the client device 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a high speed connection, such as Metro-Ethernet or OC3 (Optical Carrier level 3).

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means other than those previously listed. In yet another example illustration, the gateway may be housed at, or near, its corresponding electronic exchange. According to this instance, the client device may communicate with the gateway over a wide area network, the Internet, or through the use of Metro-Ethernet or OC3 or some other high speed connection. Further, it should be understood that the gateway may instead be located remote from the client device and remote from the electronic exchange, which might be particularly useful in systems that include interconnection of multiple trading networks. Thus, one trading network might have gateway access to an electronic exchange.

II. A Second Example Trading System

Figure 2:
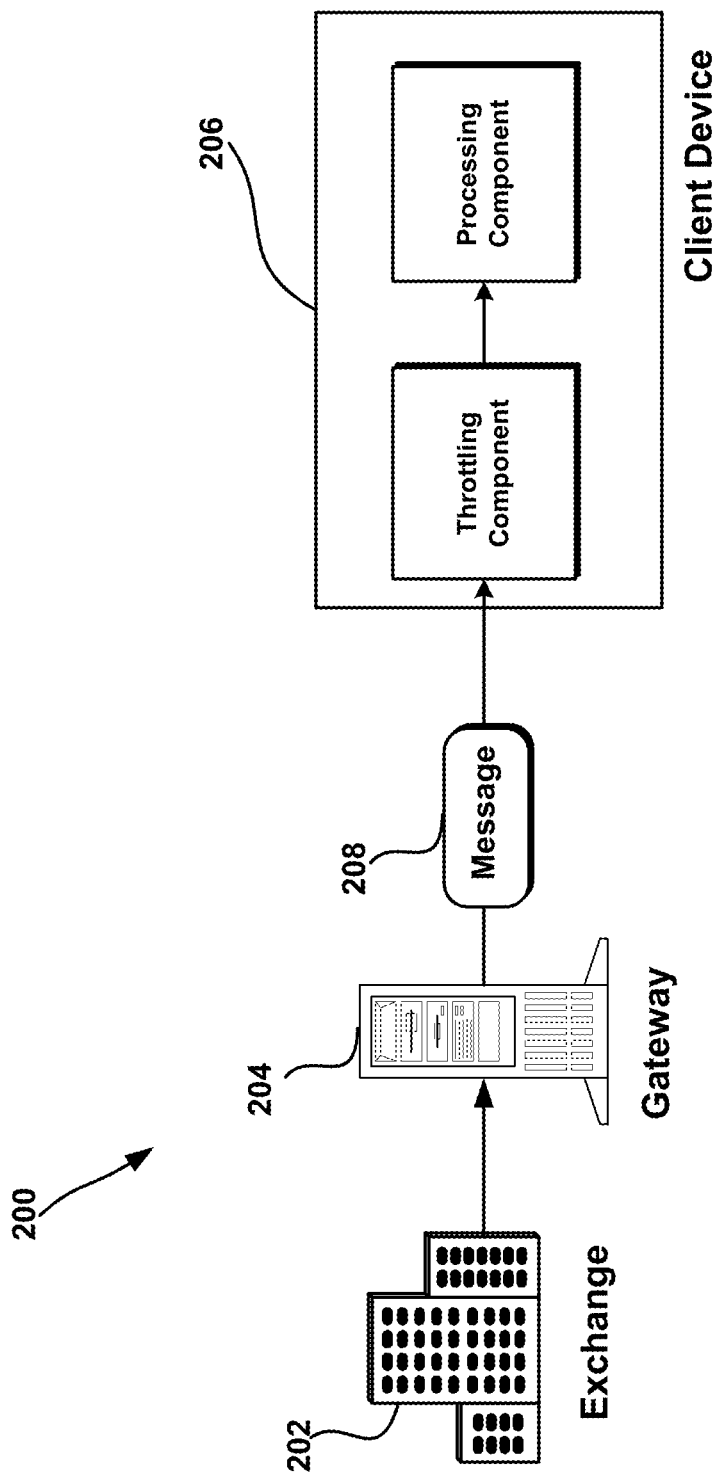
FIG. 2 is a block diagram illustrating the trading system that dynamically managing a message received from the electronic exchange.

FIG. 2 shows a block diagram illustrating a trading system that provides the dynamic management of message flow. Specifically, FIG. 2 includes an electronic exchange 202, a gateway 204, a client device 206, and message 208. Electronic exchange 202 may host one or more computer-based electronic markets. The functionality of electronic exchange 202, gateway 204, and client device 206 are the same as those described in relation to FIG. 1. Also included in FIG. 2 is illustrative message 208. Message 208 contains market information relating to a tradeable object. Message 208 may include current inside market information, trade related information, market information relating to the price levels outside the current inside market, or even market information intended for an automated tool. Determining the actual contents of message 208 may be performed at client device 206. It should be understood that the following examples illustrate dynamically managing message flow at the client device 206, but that this functionality could happen for example, at the gateway 204, or even possibly between the gateway 204 and client device 206.

According to the example embodiment, electronic exchange 202 broadcasts messages containing market information and the connected gateway 204 receives the messages. Gateway 204 then sends the message 208 to client device 206. However, once the message 208 arrives at the client device 206, the client device 206 may dynamically manage the message 208. Within client device 206 are a throttling component, a processing component, and other components used by the client device. After monitoring the percentage of CPU utilization and determining what level of throttling is needed, the throttling component controls the rate of messages to be processed by the processing component on client device 206. Processing done by the processing component may include updating the GUI or passing the message to other applications at client device 206.

Further, based on the current level of throttling applied by the throttling component and the market information included in message 208, the throttling component either passes the message onto the processing component, or throttles the market information. When the market information is throttled the throttling component stores the market information in a data structure for a defined hold time associated to the level of throttling. Generally, data structures are used to store related market data such that it can be accessed and used efficiently. There are a variety of data structures known in the art; however, the described example embodiments should not be limited to one specific type of data structure or location for the data structure.

Specifically, a message containing market information relating to the inside market or information needed for an automated trading tool is generally higher priority to the trader, and the market information will be sent to the processing component without delay. However, a message containing market information not relating to the inside market is generally considered to be a lower priority to the trader, and will therefore be throttled by the client system and the market information will be stored in a data structure to process after the associated hold time has lapsed.

The market information contained in each message may be saved at client device 206 in a data structure. If another message related to the same trading object arrives while the previous message is being held for future processing, then these messages are combined and stored in the data structure as a representation of the current state of the market as of the last known update from the exchange. Additionally, a condition can be defined to trigger a current data structure broadcast prior to the expiration of the hold timer, such as if a message of a higher priority arrives while there is a hold timer active due to the prior arrival of a lower priority message held in the data structure. Upon the trigger of the condition all the messages as combined by the throttling component are passed onto the processing component. Held messages stored in the data structure will be processed by the client device based on the amount of throttling that has been applied to control the rate of updates.

III. Dynamically Managing the Flow of Messages

Figure 3:
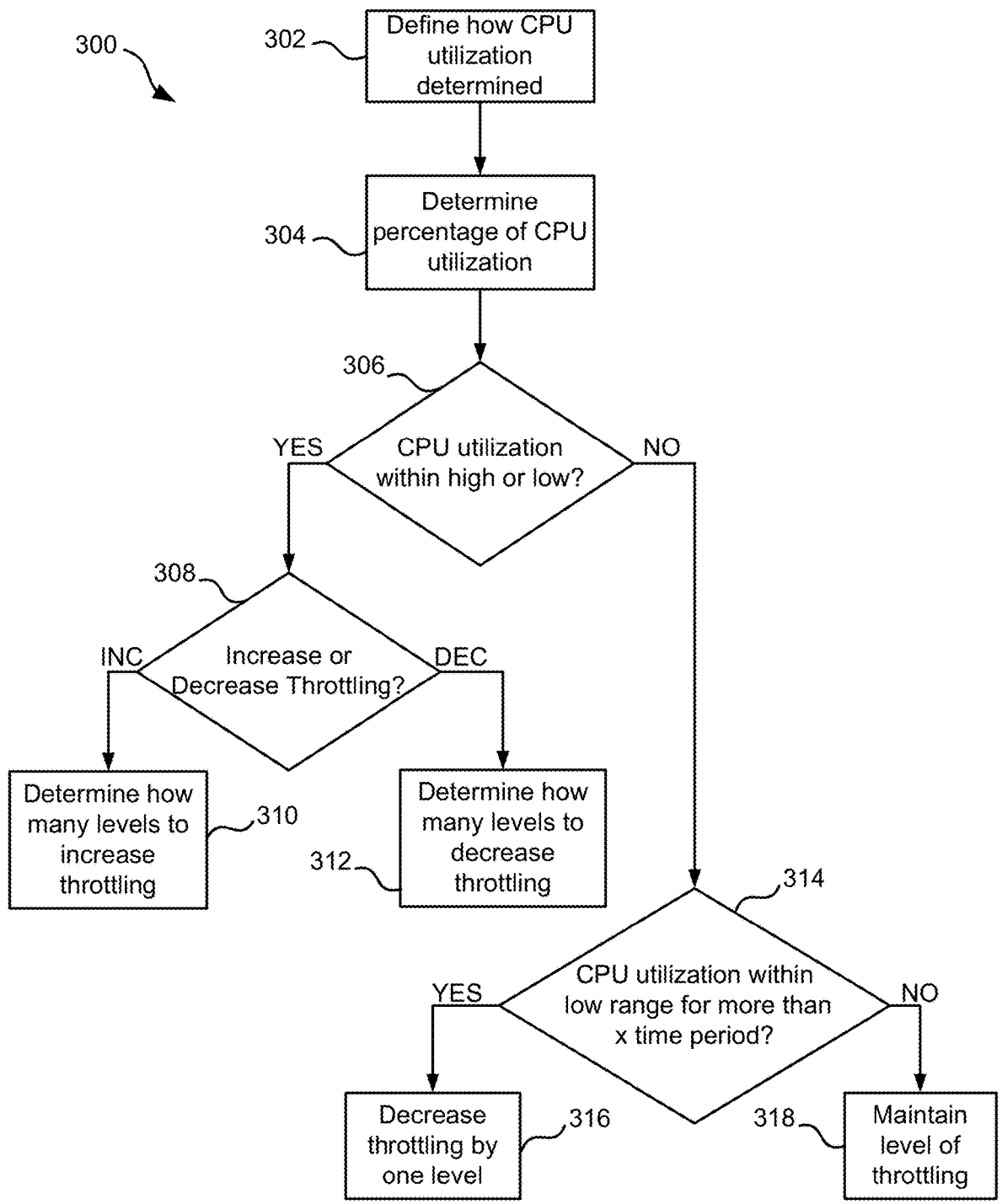
FIG. 3 is a flow chart illustrating an example method for dynamically managing the flow of message in an electronic trading environment.

FIG. 3 is a flow chart illustrating an example method for dynamically managing message flow. It should be understood that the flow chart only shows the functionality and operation of a possible implementation of the present embodiments. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At step 302, how the percentage of CPU utilization is determined is defined. This can be done by a trader, user, or possibly hard-coded into the client system. It should be understood that a client device may have a single CPU or more than one CPU, and that each CPU may have its own capabilities. According to the example embodiments, monitoring the client device includes monitoring all CPUs and determining a CPU utilization to be used for throttling of messages. A client device may rely on the busiest CPU, calculate the Total CPU utilization, or use a weighted average of CPU utilization (where weights are applied to the busiest CPU and the Total CPU utilizations). Regardless of what method is used, determining CPU utilization as a metric, such as a percentage, relative to the total CPU resources available on a client device, is necessary for dynamically managing message flow.

In one example embodiment, a percentage of CPU utilization may be obtained by monitoring the busiest CPU. According to this example, the client device monitors only the busiest CPU and disregards any other CPU. In this example, if there are four CPUs, one of which is has 100% utilization and the other three are has 20% utilization, then only the busiest CPU will be monitored and the percentage of CPU utilization used for determining the leveling of throttling to apply, will be 100%.

In another example embodiment, the percentage of CPU utilization may be determined by calculating the Total CPU utilization, which is defined as the average of the CPU utilization across all CPUs.

$$\text{Total CPU Utilization} = (\text{CPU 1 utilization} + \text{CPU 2 utilization} \ldots n)/n$$

For example, if there are four CPUs, one of which is has 100% utilization and the other three using 20% utilization, then the total CPU utilization, according to the above formula, will be Total CPU Utilization=(100%+20%+20%+20%)/4=40%. The total CPU utilization would be re-calculated each time CPU utilization is monitored periodically, at a defined increment of time, or upon a user-defined event. As shown by the previous two examples, the difference between the busiest CPU and the total CPU calculations may be significant.

In an alternative embodiment, the percentage of CPU utilization may be determined by using a weighted average of the Total CPU, calculation shown above, and busiest CPU utilization. In this example, a weight (w), valued between "0" and "1," is applied to the Total CPU utilization and the busiest CPU utilization. The following calculation is used for determining the weighted average:

$$\text{Weighted Average} = (w * \text{Total CPU}) + ((1-w) * \text{Busiest CPU})$$

In this example, based on different weights that are applied to the total CPU and the busiest CPU utilization, the weighted average may result in a percentage in between the total CPU and the busiest CPU. For example, if a weight of "0.5" is applied to each the total CPU and the busiest CPU then the weighted average calculation, according to the above formula, will be Weighted Average=(0.5*40%)+((1−0.5)*100%)=70%. It should be understood that weights of different values may also be applied to the total CPU and the busiest CPU. It should be understood that weights of different values may be applied to a CPU, as long as the total weight equals "1."

At step 304, the client device determines the CPU utilization and what percentage of the CPU is being used. The client device determines the percentage of CPU utilization using one of the defined methods described above. As the load on the CPU is continually changing, the client device may monitor the percentage of CPU utilization in a user configurable increment of time, for example, every 5 seconds. In an alternative embodiment the increment of time may also be dynamically determined based on the rate of messages received from the electronic exchange or intermediary network device. For example, if the rate of messages is very high, then the client device will monitor the percentage of CPU utilization more often than if the rate of messages is slow.

The percentage of CPU utilization will fall into one of the following ranges: "minimal" (i.e., "0-30%"), "low" (i.e., "31-50%"), "medium" (i.e., "51-70%"), "high" (i.e., "71-90%"), and "critical" ("90% +"). It should be understood that the percentages associated to each range may be defined by the user.

At step 306, the client device compares the percentage of CPU utilization to the defined ranges of "minimal", "low", "medium", "high", and "critical." Comparing the percentage of CPU utilization to the defined ranges of utilization is done to determine if throttling needs to be increased, decreased, or maintained at the current level.

At step 308, the client device determines that the CPU utilization is either "high" (i.e., >70% <=90%) or is "minimal" (i.e., <=30%). According to the example embodiments, in either case throttling must be modified to accommodate the changed flow of incoming messages, CPU utilization, and overall system responsiveness. Specifically, if the CPU utilization is "high" then throttling is increased, and if the CPU utilization is "minimal" then throttling is decreased.

At step 310, the client device determines that throttling needs to be increased, and the client device also determines how many levels to increase throttling. According the one example embodiment, throttling may be increased one level at a time. Specifically, the percentage of CPU utilization is monitored for example, every 5 seconds. If when the utilization is analyzed, the percentage of CPU utilization is in the high range, then the throttling component will increase throttling by one level. Based on this method, if there are 5 levels of throttling it will take at least 25 seconds to go from the lowest level of throttling to the highest level of throttling. In a situation where there is an unusual spike in CPU utilization, it may be useful to decrease the time it takes to set the throttling to the highest level.

According to an alternative example embodiment, the throttling component may increase the level of throttling to the maximum level instead of being modified one level at a time. Specifically, if the client device detects a condition such as an unusually high load on the CPU, such that the percentage of CPU utilization is in the "critical" range, then the throttling component may immediately increase the level of throttling to the highest level instead of going through the multiple levels of throttling. This method is useful when important market news is being released or when there is extremely high market activity. Similarly, this method may also be useful in situations where the client system knows in advance that there will be a temporary spike in CPU utilization, such as when opening up multiple trading workspaces, closing windows, etc.

At step 312, the client device determines that throttling needs to be decreased and the client device also determines how many levels to decrease throttling. According to the example embodiments, the throttling component may decrease throttling one level at a time. As previously described in relation to increasing the level of throttling, the percentage of CPU utilization is monitored, for example, every 5 seconds. If the CPU utilization is in the "minimal" range, then throttling will be decreased by one level. It may occur that too much throttling is being applied when it is not needed, and therefore messages are being throttled that the trader should be receiving and that the client device and the processing component could handle without affecting system responsiveness. In this situation it may be useful to decrease the time it takes to modify throttling to the minimum level.

According to an alternative embodiment, throttling may be instantly decreased to the minimum level based on a condition, such an unusual drop of CPU utilization, then the level of throttling may immediately be decreased to a minimum instead of going through the multiple levels of throttling. This method is especially useful in situations described above in relation to increasing throttling to maximum. For example, when important market news is being released or when there is extremely high market activity, the client device may increase throttling momentarily and when the boost in CPU utilization is over, then throttling will be decreased back to the original level. Similarly, as also described above in relation to increasing throttling, decreasing throttling to the minimum may also be useful in situations where the client system knows in advance that there will be a temporary spike in CPU utilization such as opening up multiple trading work spaces, closing windows, etc. As soon as the workspaces are finished opening or closing then throttling may be decreased to the original level. It should be understood that the lowest level of throttling corresponds to no throttling.

At step 314, the client device compares the determined percentage of CPU utilization to the defined range. The client device determines if the percentage of CPU utilization is "low" (i.e., "31-50%"), and if it has been in that range for more than a defined period of time. It should be understood that the period of time is user defined.

At step 316, the client device determines that the percentage of CPU utilization has been in the "low" range (i.e., "31-50%"), for more than a defined period of time, for example, 30 seconds. In this instance, the client device will decrease the level of throttling by one level, such that the throttling component is not applying more throttling than necessary. If after another 30 seconds has lapsed, the percentage of CPU utilization is still in the "low" range, then the throttling component will decrease throttling by another level.

At step 318, the client device determines that the percentage of CPU utilization has been in the "low" range for less than the defined period of time. In this instance the level of throttling will be maintained at the current level of throttling and when the defined period of time has lapsed the client device will re-evaluate if the level of throttling should be adjusted.

It should be understood that as throttling is adjusted from one level to another the hold time for holding messages in the data structure is also adjusting. For example, if the hold time for level "low" is defined as 20 milliseconds, then the minimum interval between processing messages is 20 milliseconds. All messages related to the same tradeable object that were received during this period of time may be combined into a single message representing the current state of the tradeable object and then passed to the processing component when the hold time lapses. In some cases, this may be done by keeping just the latest message for that treadeable object and ignoring all the previous messages for the same trading object.

Additionally, if a new market message is not received within the defined hold time of 20 milliseconds, then the next received message will immediately update the current state of the market and be passed from the throttling component to the processing component or other components running on the client device. Likewise, the hold time for level "medium" throttling may be defined as 30 milliseconds, such that the minimum interval between processing messages is 30 milliseconds. If the level of throttling increases before the hold time lapses, then any pending messages will be held an increased amount of time relative to the hold time of the increased level of throttling. Likewise, if the level of throttling decreases before the hold time lapses, then the messages will be held for less time.

The above description of the example embodiments, alternative embodiments, and specific examples, are given by way of illustration and should not be viewed as limiting. For example, CPU utilization may be determined using a variety of approaches such as busiest CPU, total CPU utilization, or a weighted average. Additionally, message throttling may be based on any system resource utilization level or any system or market event. Dynamically managing the flow of messages may take place at the gateway, client device, or some place in between the gateway and the client device. Further, many changes and modifications within the scope of the present embodiments may be made without departing from the spirit thereof, and the present invention includes such changes and modifications.

It will be apparent to those of ordinary skill in the art that methods involved in the system and method for dynamically managing the message flow may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method including:
    monitoring by a client device a resource of the client device, wherein the resource of the client device is a rate that messages are received by the client device from a gateway device;
    dynamically throttling by the gateway device market information sent to the client device between a plurality of levels of throttling according to utilization of the monitored resource, wherein each level of throttling of the plurality of levels of throttling includes storing the market information at the gateway device for a corresponding hold time;

sending by the gateway device messages including the market information to the client device according to expiration of the corresponding hold time for the level of throttling; and displaying by the client device the dynamically throttled market information.

2. The method of claim 1, wherein the resource of the client device is the rate that marking information messages are received by the client device from the gateway device.

3. The method of claim 2, further including:

receiving by the gateway device a throttling management strategy; and selecting by the gateway device a level of throttling of the plurality of levels of throttling based on the throttling management strategy.

4. The method of claim 1, wherein each level of throttling of the plurality of levels of throttling includes a different hold time.

5. The method of claim 1, wherein dynamically throttling the market information includes adjusting between at least a first level of throttling and a second level of throttling according to a change in a utilization level of the monitored resource.

6. The method of claim 1, wherein the monitored resource further includes a central processing unit.

7. The method of claim 1, wherein the monitored resource further includes a plurality of central processing units.

8. The method of claim 7, wherein the utilization of the monitored resource includes utilization of a first central processing unit of the plurality of central processing units.

9. The method of claim 8, wherein the first central processing unit includes a busiest central processing unit of the plurality of central processing units.

10. The method of claim 1, wherein the market information sent to the client device according to expiration of the hold time is only the latest market information.

* * * * *